United States Patent
Lee et al.

(10) Patent No.: US 9,491,733 B2
(45) Date of Patent: Nov. 8, 2016

(54) METHOD FOR PROVIDING INFORMATION THROUGH WIRELESS LAN AND APPARATUS THEREFOR

(71) Applicant: KT CORPORATION, Gyeonggi-do (KR)

(72) Inventors: Jang Won Lee, Gyeonggi-do (KR); Young Su Han, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/759,732

(22) PCT Filed: Nov. 4, 2013

(86) PCT No.: PCT/KR2013/009884
§ 371 (c)(1),
(2) Date: Jul. 8, 2015

(87) PCT Pub. No.: WO2014/109467
PCT Pub. Date: Jul. 17, 2014

(65) Prior Publication Data
US 2015/0351070 A1    Dec. 3, 2015

(30) Foreign Application Priority Data

Jan. 8, 2013 (KR) ........................ 10-2013-0002189

(51) Int. Cl.
| | | |
|---|---|---|
| *H04W 64/00* | (2009.01) | |
| *H04W 84/12* | (2009.01) | |
| *H04W 48/16* | (2009.01) | |
| *H04W 48/12* | (2009.01) | |

(52) U.S. Cl.
CPC ............ *H04W 64/00* (2013.01); *H04W 48/12* (2013.01); *H04W 48/16* (2013.01); *H04W 84/12* (2013.01)

(58) Field of Classification Search
CPC . H04W 48/16; H04W 4/005; H04W 76/023; H04W 72/005; H04W 64/00; H04W 84/12; H04W 12/06; H04W 60/04; G01S 5/06; H04L 63/08

USPC ........... 455/411, 456.5; 370/311, 230, 328, 370/338, 254; 340/5.64; 726/6

See application file for complete search history.

(56) References Cited

U.S. PATENT DOCUMENTS

| | | |
|---|---|---|
| 2011/0103360 A1 | 5/2011 | Ku et al. |
| 2013/0165150 A1 | 6/2013 | Cho et al. |
| 2013/0235863 A1 | 9/2013 | Cho et al. |
| 2014/0003282 A1* | 1/2014 | Kafle ................... H04W 48/14 370/254 |

FOREIGN PATENT DOCUMENTS

| | | | |
|---|---|---|---|
| KR | 10-2011-0049594 A | 5/2011 | |
| KR | 10-1086266 B1 | 11/2011 | |

(Continued)

OTHER PUBLICATIONS

Korean Intellectual Property Office, Office Action of KR Application No. 10-2013-0002189, Jul. 7, 2014.

*Primary Examiner* — Phuoc H Doan
(74) *Attorney, Agent, or Firm* — IP Legal Services, LLC

(57) ABSTRACT

Disclosed is a method of determining, by an access point (AP), a location of a terminal by use of a wireless local area network (LAN). The method may include detecting a probe request frame transmitted by a terminal searching for a wireless LAN through active scanning, obtaining a MAC address of the terminal from a configuration value of an SA field of the probe request frame regardless of a configuration value of a BSSID field of the probe request frame, and transmitting the MAC address of the terminal and ID information of the AP to a server.

14 Claims, 9 Drawing Sheets

(56) References Cited

FOREIGN PATENT DOCUMENTS

| KR | 10-2011-0137068 A | 12/2011 |
| KR | 10-2012-0021875 A | 3/2012 |
| WO | 2012/005468 A2 | 1/2012 |
| WO | 2012/053790 A2 | 4/2012 |

* cited by examiner

METHOD FOR PROVIDING INFORMATION THROUGH WIRELESS LAN AND APPARATUS THEREFOR

CROSS REFERENCE TO RELATED APPLICATIONS

This application is a National Stage Patent Application of PCT International Patent Application No. PCT/KR2013/009884 (filed on Nov. 4, 2013) under 35 U.S.C. §371, which claims priority to Korean Patent Application No. 10-2013-0002189 (filed on Jan. 8, 2013), the teachings of which are incorporated herein in their entireties by reference.

BACKGROUND

1. Technical Field

The present disclosure relates to a method and an apparatus for providing information to a mobile terminal, more specifically to a method and an apparatus for providing information to a terminal based on location information of the terminal obtained using a wireless local area network (LAN).

2. Background Art

With the rapid growth of the telecommunications technology, various wireless communication services have been introduced and provided through wireless networks. For example, a wireless communication system provides various services such as voice service using a wireless communication network. Such services have been advanced to a multimedia communication service for transmitting packet data.

Among various wireless Internet services provided through mobile communication terminals, a location based service (LBS) has been particularly popular due to its broad applicability and convenience. The location based service refers to a communication service that detects a location of a mobile communication terminal (e.g., a mobile phone or a personal digital assistant (PDA)) and provides additional information associated with the detected location.

The location determination technology for providing the LBS includes i) a network based method, in which a location of a mobile communication terminal is determined based on a software method of using a radio wave environment of cell coverage of base stations in a mobile communication network, ii) a handset based method, in which the location of a mobile communication terminal is determined using a global positioning system (GPS) receiver installed in the mobile communication terminal, and iii) a hybrid method, in which the network based method and the handset based method are combined.

Of these methods, the network based location determination technology is used more in shadow areas where GPS radio waves are not reachable. However, the network based location determination technology has the shortcoming of possible deterioration of location determination capability due to, for example, repeater environments. Another shortcoming of the network based location determination technology is that a determined location may not be very accurate because the base stations are not densely installed.

As the accurate detection of the location of a terminal would allow more specific information to be provided, the precise determination of the location of the terminal has a very important meaning in a service designed to provide location based information.

SUMMARY

In accordance with an aspect of the present embodiment, a system may precisely determine a location of a terminal using a wireless local area network.

In accordance with another aspect of the present embodiment, an access point (AP) may be capable of operating in a location determination system.

In accordance with still another aspect of the present embodiment, an information providing system may include a server configured for i) obtaining location information of a mobile terminal from an access point (AP) operating in a location determination system, ii) processing the obtained information, iii) selecting information to be provided based on the processed location information, and iv) providing the selected information to the mobile terminal.

In accordance with at least one embodiment, a method may be provided for determining, by an access point (AP), a location of a terminal using a wireless location area network (LAN). The method may include detecting a probe request frame transmitted by a terminal searching for a wireless LAN through active scanning, obtaining a medium access control (MAC) address of the terminal from a configuration value of an source address (SA) field of the probe request frame regardless of a configuration value of a BSSID field of the probe request frame, and transmitting the MAC address of the terminal and ID information of the AP to a server.

The ID information of the AP may include an IP address of the AP, a MAC address of the AP, an ID of a basic service area (BSA) of the AP and an ID of the AP.

The ID information of the AP may further include location information of the AP.

The detecting of the probe request frame may be performed through a physical carrier sense or a virtual carrier sense of the AP.

The method may further include: transmitting a probe response frame to the terminal in response to the probe request frame, if the configuration value of the BSSID field indicates the AP or is a wildcard BSSID; and discarding the probe request frame after obtaining the MAC address of the terminal, if the configuration value of the BSSID indicates a specific AP other than the AP.

In accordance with another embodiment, a system may be provided for providing information based on a location of a terminal by use of a wireless local area network (LAN). The system may include an access point (AP) and a terminal entry information providing server. The AP may be configured to detect a probe request frame transmitted by a terminal searching for a wireless LAN through active scanning and to obtain a medium access control (MAC) address of the terminal from a configuration value of an source address (SA) field of the probe request frame regardless of a configuration value of a BSSID field of the probe request frame. The terminal entry information providing server may be configured to obtain the MAC address of the terminal and ID information of the AP and obtain location information of the terminal from the ID information of the AP.

The system may further include an AP location information database configured to obtain the ID information of the AP from the terminal entry information providing server and provide BSA information of the AP indicated by the ID information of the AP to the terminal entry information providing server.

The system may further include an information providing server configured to obtain the location information of the terminal from the terminal entry information providing server, select information to be provided to the terminal based on the location information, and provide the selected information to the server.

The system may further include a subscriber database configured to obtain the MAC address of the terminal, extract subscriber information of the server from the MAC address of the terminal, and provide the subscriber information to the information providing server.

In accordance with yet another embodiment, an access point (AP) may be provided. The AP may include a processor and a transceiver connected functionally with the processor. The transceiver may be configured to transmit and receive a wireless frame. The processor may be configured to detect a probe request frame transmitted by a terminal searching for a wireless LAN through active scanning, obtain a MAC (medium access control) address of the terminal from a configuration value of an SA (source address) field of the probe request frame regardless of a configuration value of a BSSID field of the probe request frame and transmit the MAC address of the terminal and ID information of the AP to a server.

In accordance with at least one embodiment, a system may determine a precise location of a terminal. Accordingly, it is possible to measure and provide the precise location of the terminal to a service providing server. It is also possible to provide customized information to a user based on the provided location of the terminal.

Moreover, it is possible to determine the precise location of the terminal in a wireless LAN, without relying on a mobile communication network, and to determine the location of the terminal in an active scanning process, regardless of association with an AP.

Accordingly, service providers can provide a variety of information as well as new services in various fields, including advertisement, marketing, security, safety, etc., due to the customized information based on the precise location of the terminal.

DETAILED DESCRIPTION

Since there can be a variety of permutations and embodiments of the present disclosure, certain embodiments will be illustrated and described with reference to the accompanying drawings. This, however, is by no means to restrict the present invention to certain embodiments, and shall be construed as including all permutations, equivalents and substitutes covered by the ideas and scope of the present invention. Throughout the description of the present invention, when describing a certain relevant conventional technology is determined to evade the point of the present invention, the pertinent detailed description will be omitted.

Terms such as "first" and "second" can be used in describing various elements, but the above elements shall not be restricted to the above terms. The above terms are used only to distinguish one element from the other.

The terms used in the description are intended to describe certain embodiments only, and shall by no means restrict the present invention. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, some embodiments will be described in detail with reference to the accompanying drawings.

Figure 1:
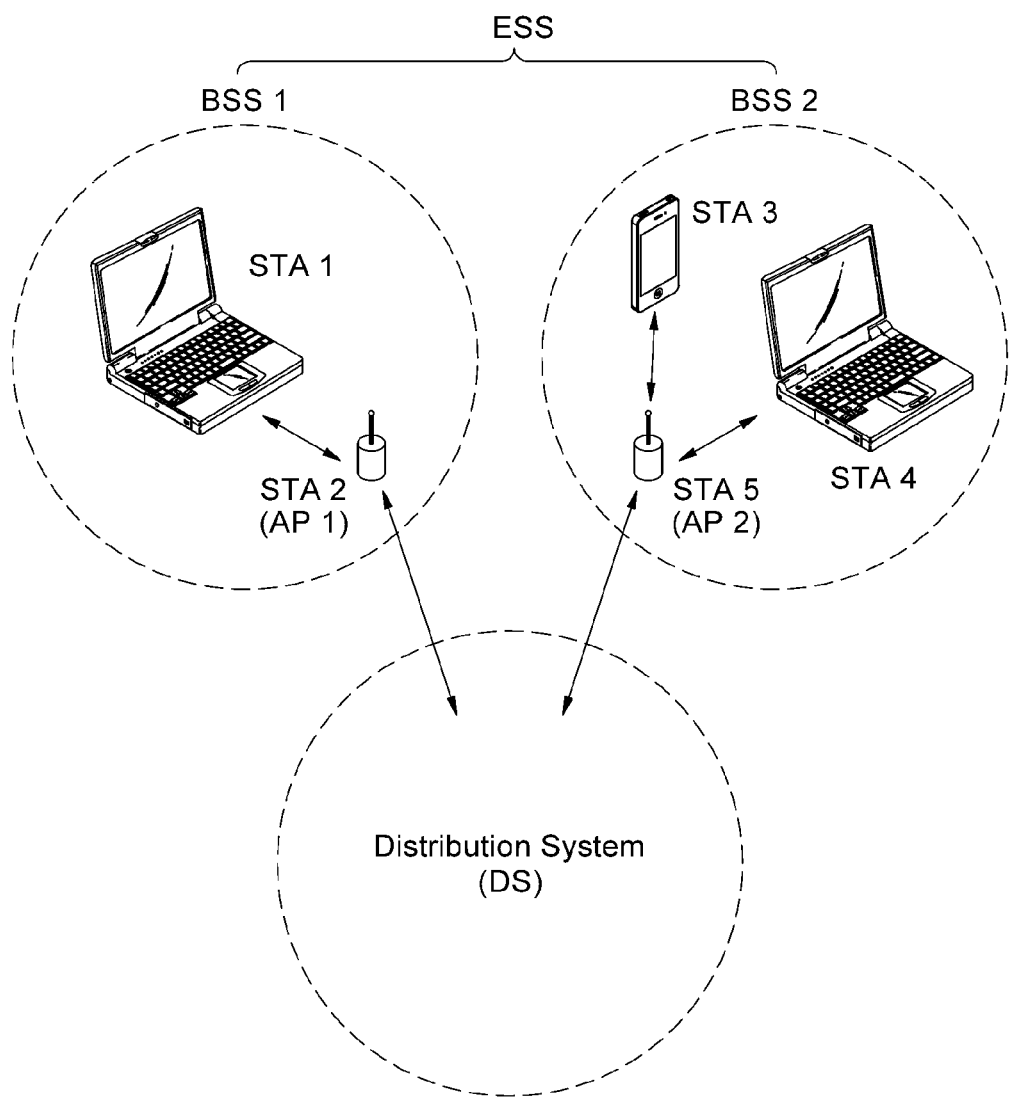
FIG. 1 illustrates a typical wireless local area network (LAN) system.

FIG. 1 illustrates a typical wireless local area network (LAN) system to which at least one embodiment is applicable.

Referring to FIG. 1, a wireless LAN system includes at least one basic service set (BSS). The BSS is a group of stations (STA) that can be successfully synchronized and communicate with one another. It does not refer to a specific area. The BSS may be classified into an infrastructure BSS and an independent BSS (IBSS). FIG. 1 illustrates an infrastructure BSS. The infrastructure BSS (e.g., BSS1, BSS2) includes one or more terminals (e.g., STA1, STA3, STA4), an access point (AP) for providing a distribution service, and a distribution system (DS) for connecting a plurality of APs (AP1, AP2). Meanwhile, since the IBSS does not include any AP, every terminal is a mobile terminal. Furthermore, since it is not allowed to access to the DS, the IBSS is configured as a self-contained network.

A wireless LAN terminal is a functional medium that includes a physical layer interface for a wireless medium and a medium access control (MAC) complying with the IEEE 802.11 standard. The wireless LAN terminal includes both AP stations and non-AP stations in a broad sense. Among the STAs, the mobile terminals operated by a user are non-AP STAs (e.g., STA1, STA3, and STA4). Simply, a STA may refer to a non-AP STA. The non-AP STA may be referred to as other names, including a terminal, a wireless transmit/receive unit (WTRU), user equipment (UE), a mobile station (MS), a mobile terminal, and a mobile subscriber unit. Hereinafter, these various terms will be collectively referred to as a "terminal."

The AP (e.g., AP1, AP2) is a functional medium that provides an access to the DS via a wireless medium for a terminal associated therewith. In principle, terminals communicate each other through the AP in the infrastructure BSS having the AP. However, direct communication among the terminals is also possible if a direct link is configured. The AP may be also referred to as a convergence controller, a base station (BS), a node-B, a base transceiver system (BTS) or a site controller.

The distribution system (DS) may connect a plurality of infrastructure BSSs. The plurality of BSSs connected through the DS is referred to as an extended service set (ESS). The terminals included in the ESS may communicate with one another, and a terminal may move from one BSS to another BSS without communication interruption within a same ESS.

The DS allows one AP to communicate with another AP. With the DS, the AP can i) transmit frames for terminals associated with the BSS managed by the AP, ii) transfer frames if any one STA moves to another BSS and iii) transfer frames to an external network such as a wired network. It is not necessary that the DS is a network. The DS may be any form as long as a distribution service defined in the IEEE 802.11 standard can be provided. For example, the DS may be a wireless network, such as a mesh network, or a physical structure for allowing the APs to be connected with one another.

Before a terminal accesses the wireless LAN, it is necessary to search all available LANs. That is, all compatible networks need to be identified before participating in the wireless LAN. Such procedures for identifying the available and compatible networks in a particular area are referred to as a scanning process.

Table 1 shows the types of parameters and brief descriptions thereof that can be used in the scanning process.

TABLE 1

| Name | Type | Valid range | Description |
| --- | --- | --- | --- |
| BSSType | Enumeration | INFRASTRUCTURE, INDEPENDENT, ANY_BSS | Determines whether infrastructure BSS, IBSS, or both, are included in the scan. |
| BSSID | MACAddress | Any valid individual or broadcast MAC address | Identifies a specific or wildcard BSSID. |
| SSID | Octet string | 0-32 octets | Specifies the desired SSID or the wildcard SSID. |
| ScanType | Enumeration | ACTIVE, PASSIVE | Indicates either active or passive scanning. |
| ProbeDelay | Integer | N/A | Delay (in microseconds) to be used prior to transmitting a Probe frame during active scanning. |
| ChannelList | Ordered set of integers | Each channel will be selected from the valid channel range for the appropriate PHY and carrier set. | Specifies a list of channels that are examined when scanning for a BSS. |
| MinChannelTime | Integer | ≥ProbeDelay | The minimum time (in TU) to spend on each channel when scanning. |
| MaxChannelTime | Integer | ≥MinChannelTime | The maximum time (in TU) to spend on each channel when scanning. |
| VendorSpecificInfo | A set of information elements | | Zero or more information elements. |

The terminal performs the scanning process to scan an accessible network according to parameters shown in Table 1. Specifically, the terminal performs one of an active scanning process and a passive scanning process according to the parameter value of ScanType in Table 1.

Figure 2:
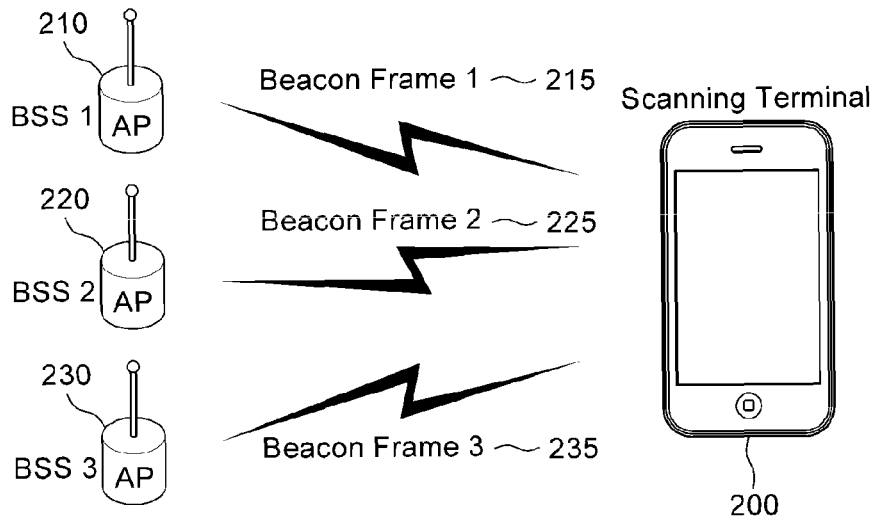
FIG. 2 is a brief illustration for describing passive scanning.

FIG. 2 is a brief illustration for describing a passive scanning process.

In the passive scanning process, a terminal moves from one channel to another in a list of channels according to a parameter of ChannelList and waits for a beacon frame in a pertinent channel. The beacon frame, which is one of management frames defined in the IEEE 802.11 standard, is periodically transmitted so as to allow terminals to recognize the presence of a wireless network and to allow the scanning terminal to find and join the wireless network. In the infrastructure network, the AP plays the role of transmitting the beacon frame periodically.

The passive scanning terminal buffers the received beacon frame in order to obtain information about the BSS and moves to another channel to write information about the received beacon frame in the pertinent channel.

Referring to FIG. 2, a terminal 200 is scanning a particular channel in the passive scanning method. Here, if the terminal 200 receives a beacon frame 215 transmitted by AP1 210 of BSS1 and a beacon frame 225 transmitted by AP2 220 of BSS2 but does not receive a beacon frame 235 transmitted by AP3 230 of BSS3, the terminal 200 buffers information that 2 BSSs (e.g., BSS1, BSS2) are discovered in the current channel and then moves to another channel. By repeating this process, all channels in the list of channels are scanned.

Figure 3:
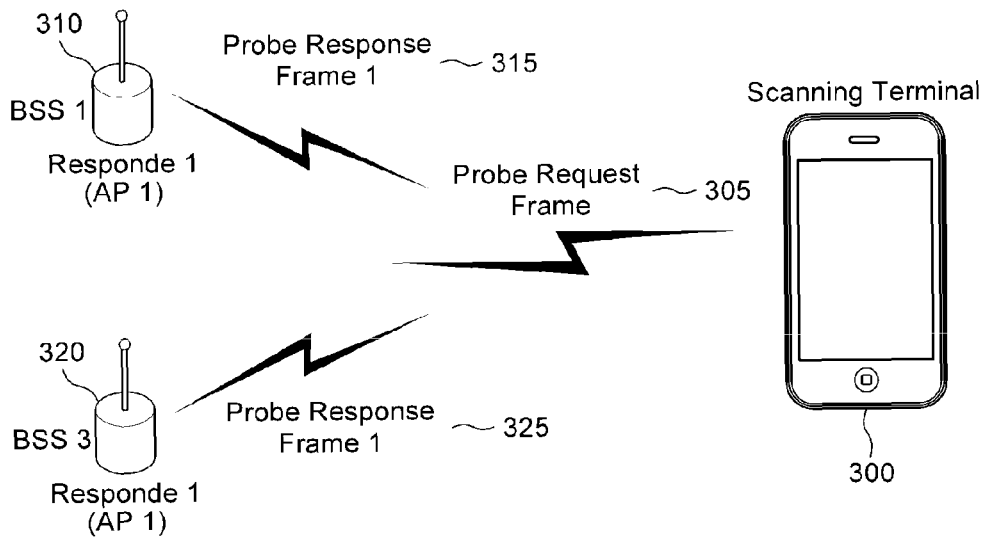
FIG. 3 is a brief illustration for describing active scanning.

FIG. 3 is a brief illustration for describing an active scanning process.

In the active scanning process, a scanning terminal i) moves from one channel to another in the list of channels, ii) transmits a probe request frame, which is a management frame being sent to inquire about what kinds of APs are available around each channel, and iii) waits for an answer to the probe request frame. A responder sends a probe response frame in response to the probe request frame. Here, the responder is a STA that has transmitted the last beacon frame in a BSS of the channel being scanned. Since an AP transmits the beacon frame in the infrastructure BSS, the AP is the responder in the infrastructure BSS. However, since the terminals take turns to transmit the beacon frame in the IBSS, there is no single fixed responder in the IBSS.

Referring to FIG. 3, once a terminal 300 transmits a probe request frame 305, a responder 1 310 of BSS1 and a responder 2 320 of BSS2 that have listened to this send a probe response frame 1 315 and a probe response frame 2 325, respectively, to the terminal 300. The terminal 300 having received the probe response frames buffers BSS-related information from the received probe response frames and then moves to a next channel to scan the next channel in the same process as described above.

Figure 4:
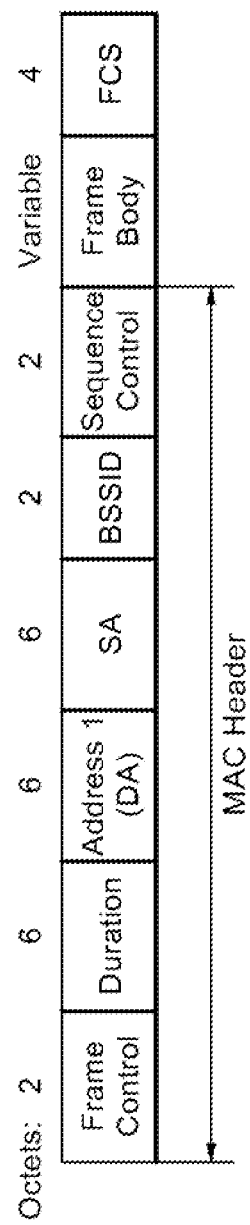
FIG. 4 is a block diagram showing a management frame format defined in IEEE standard 802.11.

FIG. 4 is a block diagram showing a management frame format defined in IEEE standard 802.11. Referring to FIG. 4, the management frame is constituted with a MAC header, a frame boy and an FCS. The details about the fields and subfields that constitute the management frame are described in IEEE Std 802.11-2007 (8 Mar. 2007) (Revision of IEEE Std 802.11-1999), "IEEE Standard for Information Technology-Telecommunications and information exchange between systems-Local and metropolitan area networks-Specific requirements, Part 11: Wireless LAN Medium Access Control (MAC) and Physical Layer (PHY) Specifications" and thus will not be described herein for the convenience of description. The details described in the IEEE Std 802.11-2007 (8 Mar. 2007) may be fully incorporated in the present specification.

The subfields of a frame control field include a type subfield and a subtype subfield. Such subfields are distinguished to a management frame, a control frame and a data frame, according to the configuration value of the type subfield. For example, the 2-bit type subfield of the management frame is configured as "00." When the type subfield is configured as "00," the management frame is distinguished to a probe response frame, a beacon frame, etc., according to the configuration of the 4-bit subtype subfield.

The probe request frame is a management frame used for searching for an accessible network around a channel when a terminal performs the active scanning process in the IEEE 802.11 standard. For the probe request frame, the type subfield and the subtype subfield of the frame control field are configured as "00" and "0100," respectively.

Table 2 shows an example of information elements included in the probe request frame.

TABLE 2

| Order | Information | Notes |
|---|---|---|
| 1 | SSID | |
| 2 | Supported rates | |
| 3 | Request information | May be included if dotl 1MultiDomainCapabilityEnabled is true. |
| 4 | Extended Supported Rates | The Extended Supported Rates element is present whenever there are more than eight supported rates, and it is optional otherwise. |
| Last | Vendor Specific | One or more vendor-specific information elements may appear in this frame. This information element follows all other information elements. |

Referring to Table 2, the probe request frame includes SSID and Supported rates and may include Request information, Extended Supported Rates and Vendor Specific information elements. The SSID, which stands for Service Set ID, may be the name of a network and has a length between 0 and 32 octets. In the probe request frame, the SSID may be configured as an SSID of a particular network or as a wildcard SSID (0 octet) for searching all networks. The Supported rates are data rates supported by the terminal. The SSID and Supported rates are criteria for determining whether the network is compatible.

The probe response frame is a management frame transmitted to the scanning terminal in response to the probe request frame to notify the presence of the network in the IEEE 802.11 standard. For the probe response frame, the type subfield and the subtype subfield of the frame control field are configured as "00" and "0101," respectively.

Figure 5:
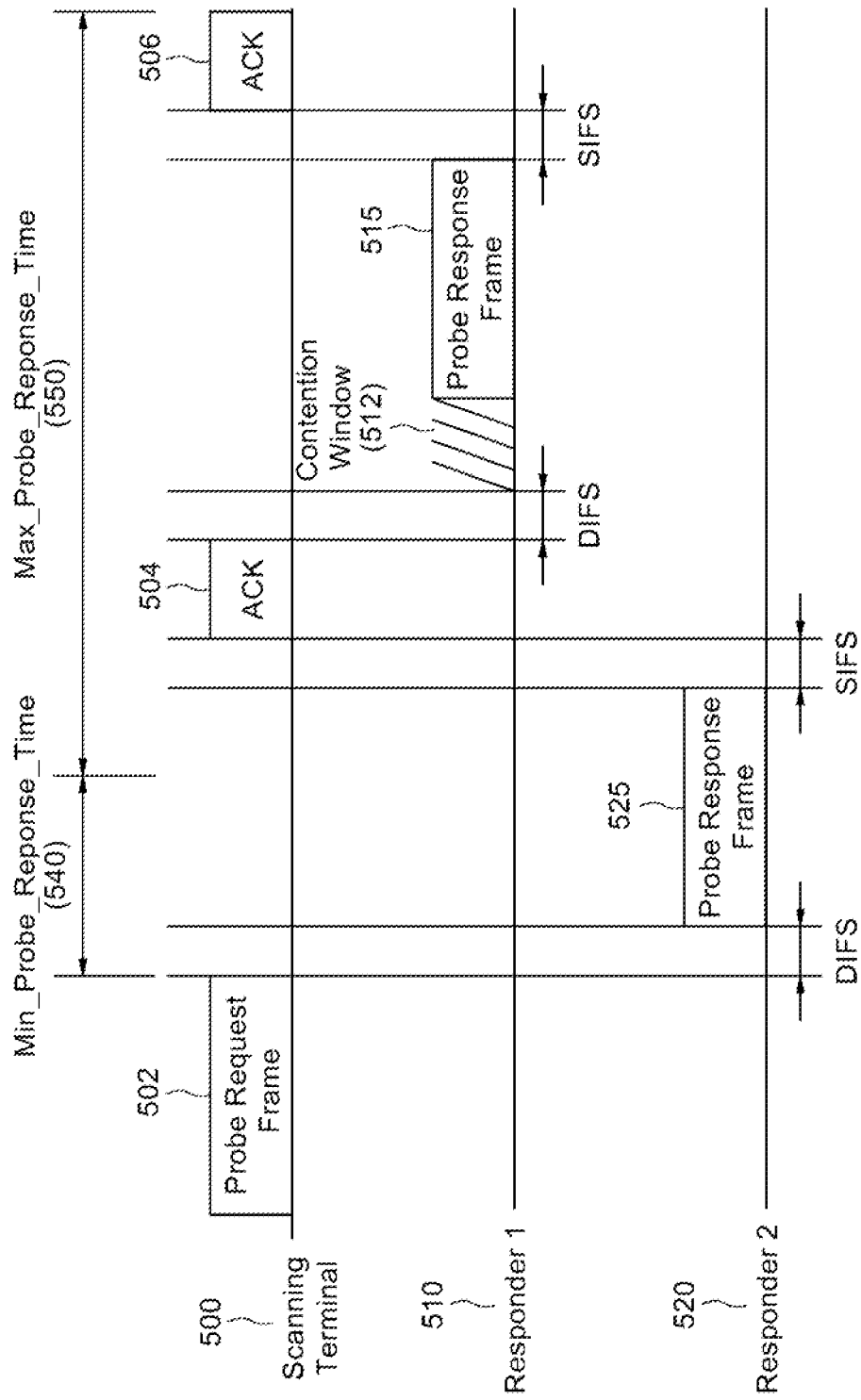
FIG. 5 is a brief illustration for describing an active scanning process.

FIG. 5 is a brief illustration for describing an active scanning process.

Referring to FIG. 5, after a terminal 500 has moved to a specific channel, the terminal 500 waits until a ProbeDelay timer is expired. If there is a frame transmitted through the channel before the ProbeDelay timer is expired, that the terminal 500 determines whether the channel is in use, and then the channel is scanned. The terminal 500 obtains an approach to a medium by use of basic DCF approach procedures of the IEEE 802.11 standard and transmits a probe request frame 502.

In the example of FIG. 5, a responder 1 510 and a responder 2 520 that have listened to a probe request of the terminal 500 transmit a probe response frame to the terminal 500. Here, the responders 510, 520 may be APs of an infrastructure BSS or terminals of an IBSS that have transmitted the last beacon frame. In the case where plural responders provides responses as shown in the example of FIG. 5, the second response, which is a response 515 of the responder 1 510 in FIG. 5, is based on the DCF rules of the IEEE 802.11 standard, and thus a probe response frame 515 is transmitted through a contention Window 512 process.

In the example shown in FIG. 5, Min_Probe_Response_Time 540 is a minimum response time. If a first response is made before the minimum response time is expired, the terminal 500 waits for another response until a maximum response time (Max_Probe_Response_Time 550) is expired. If there is no other response until Max_Probe_Response_Time 550 is expired, the terminal 500 determines that there are two BSSs in the current channel.

Hereinafter, a method of determining a location of a terminal using the above-described active scanning process and a method and a system for providing information to a terminal based on location information of the terminal will be described.

Figure 6:
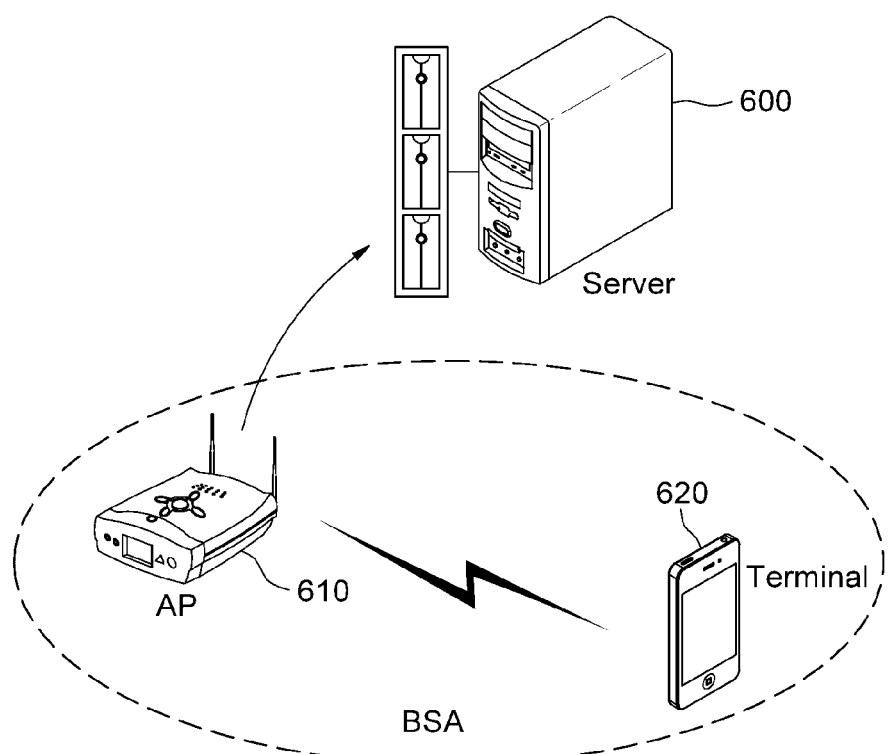
FIG. 6 illustrates a location determination system in accordance with an embodiment.

FIG. 6 illustrates a location determination system in accordance with at least one embodiment.

The location determination system includes an AP (e.g., 610). Once a signal of a terminal (e.g., 620) is detected within a basic service area (BSA), the AP recognizes that the terminal is present within the BSA and sends an ID of the terminal and an ID of the AP to a server (e.g., 600).

The server may assess the location of the terminal based on the ID of the terminal and the ID of the AP obtained from the AP, configure information to be provided to the terminal, and provide the information to the terminal directly or through the AP. The server may have information stored therein for assessing the location of the terminal and configuring the information to be provided to the terminal, or may be linked with another server that has such information stored therein. A specific configuration of the server and providing the information through various functions of the server will be described later in detail with reference to a specific embodiment.

Figure 7:
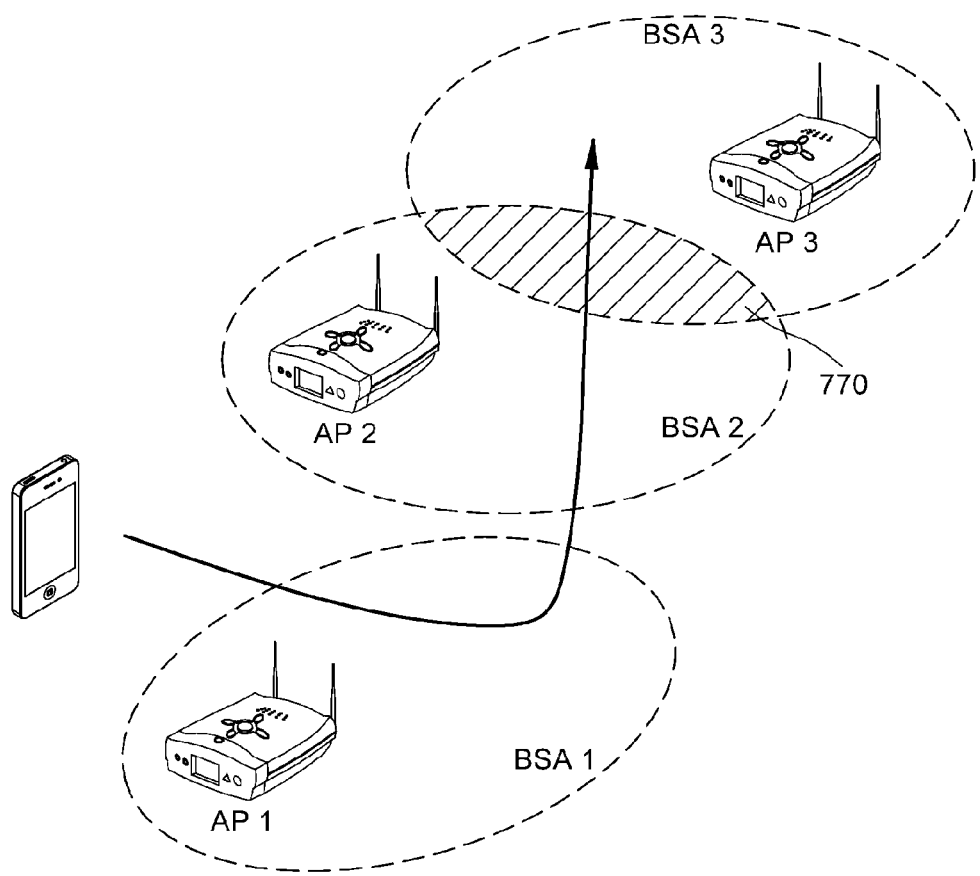
FIG. 7 is a brief illustration for describing how location is determined when a terminal is moved.

FIG. 7 is a brief illustration for describing how location is determined when a terminal is moved.

Assuming that a terminal is moving as indicated with an arrow in FIG. 7, an AP1 detects a signal of the terminal and provides an ID of the AP1 and an ID of the terminal to a server when the terminal is in a BSA of the AP1. Once the terminal moves and enters a BSA of an AP2, the AP2 having detected the signal of the terminal provides an ID of the AP2 and the ID of the terminal to the server. Likewise, when the terminal moves and enters a BSA of an AP3, the AP3 having detected the signal of the terminal provides an ID of the AP3 and the ID of the terminal to the server.

In case where the terminal is located in an area 770, where basic service areas of the AP2 and the AP3 overlap with each other, the AP2 and the AP3 may each detect the signal of the terminal and provide the ID of the terminal and their respective ID to the server.

Figure 8:
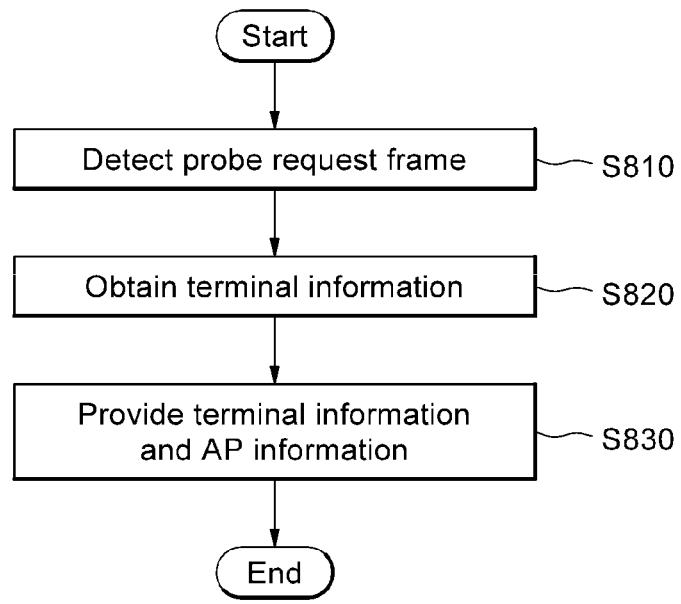
FIG. 8 is a flow diagram illustrating an operation of an AP in a location determination system in accordance with an embodiment.

FIG. 8 is a flow diagram for illustrating an operation of an AP in a location determination system in accordance with an embodiment.

Referring to FIG. 8, an AP detects a probe request frame transmitted by a terminal within a BSA of the AP (S810). The AP may detect the frame transmitted within the BSA through a physical or logical carrier sensing (CS) method.

The AP obtains information on the terminal from the probe request frame when the probe request frame is detected, regardless of a configuration value of a BSSID field of the probe request frame transmitted by the terminal within the BSA (S820). Even if the address configured in the BSSID field is not configured as the BSSID of the server or as a wildcard BSSID, the server does not discard the probe request frame detected in the BSA but obtains a MAC address of the terminal, which sent the probe request frame, from a TA field (i.e., address 2 field) of the probe request frame. In accordance with an embodiment of the present disclosure, the MAC address of the terminal is obtained regardless of the configuration value of the BSSID field of the probe request frame transmitted by the terminal through an active scanning process. Accordingly, the AP may obtain the information on the terminal by merely detecting the probe request frame transmitted by the terminal, regardless of association of the AP with the terminal.

The AP provides the information on the terminal and information on the AP to the server (S830). The AP may send ID information of the AP and ID information of the terminal (e.g., MAC address of the terminal) obtained from the probe request frame transmitted by the terminal to the server through a wired/wireless communication network. The ID information of the AP may include a BSSID of the AP, a MAC address of the AP, an IP address of the AP, a BSA ID of the AP, location information of the AP, etc.

The location determination system in accordance with an embodiment does not require the configuration of the terminal to be changed or an operation to be added for the location determination system because the terminal can provide the location thereof by simply performing the active scanning process of searching for an accessible wireless LAN. Moreover, since the terminal operates regardless of authentication and association with the AP in the location determination system in accordance with an embodiment, it is not necessary for the terminal to have capability of authentication and association with the AP that constitutes the location determination system.

Figure 9:
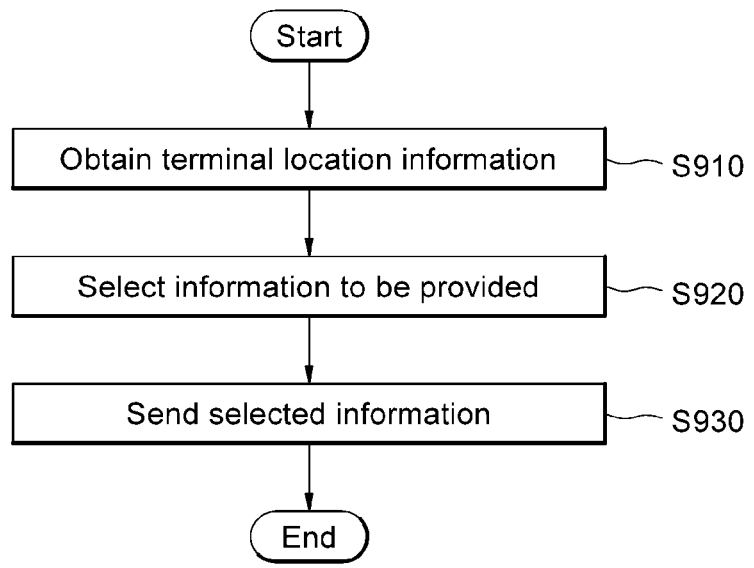
FIG. 9 is a flow diagram illustrating an operation of a server in a location determination system in accordance with an embodiment.

FIG. 9 is a flow diagram for illustrating an operation of a server in a location determination system in accordance with an embodiment.

Referring to FIG. 9, a server obtains location information of a terminal (S910). The server may obtain the location information of the terminal from ID information of an AP and the ID information of the terminal, which are obtained from the AP. In accordance with an embodiment of the present disclosure, the ID information of the AP includes the location information of the AP. Accordingly, the server may be capable of determining whether the terminal is in a service area of the corresponding AP from the location information of the AP. When the ID information of the AP does not include location information of the AP, the server may inquire the location information of the AP to an associated database (DB) that stores the location information of the AP based on the identifier (e.g., BSS ID, BSA ID, MAC address) of the AP.

The server selects/configures information to be provided to the terminal, based on the obtained location information of the terminal (S920). Some examples of the information to be provided to the terminal may include lifestyles information, shopping information, facilities information, etc., based on the current location of the terminal. The information to be provided to the terminal may be pre-stored in the server or a server linked with the server.

The server transmits the information selected based on the location information of the server to the server (S930). There is no particular restriction on how the selected information is provided to the terminal. In the case where the terminal is associated with the AP through an earlier active scanning process, the selected information may be transmitted through the AP associated with the terminal. If the terminal is not associated with the AP, the server may provide the selected information directly to the terminal by use of a different type of communication network, for example, a mobile communication network.

Figure 10:
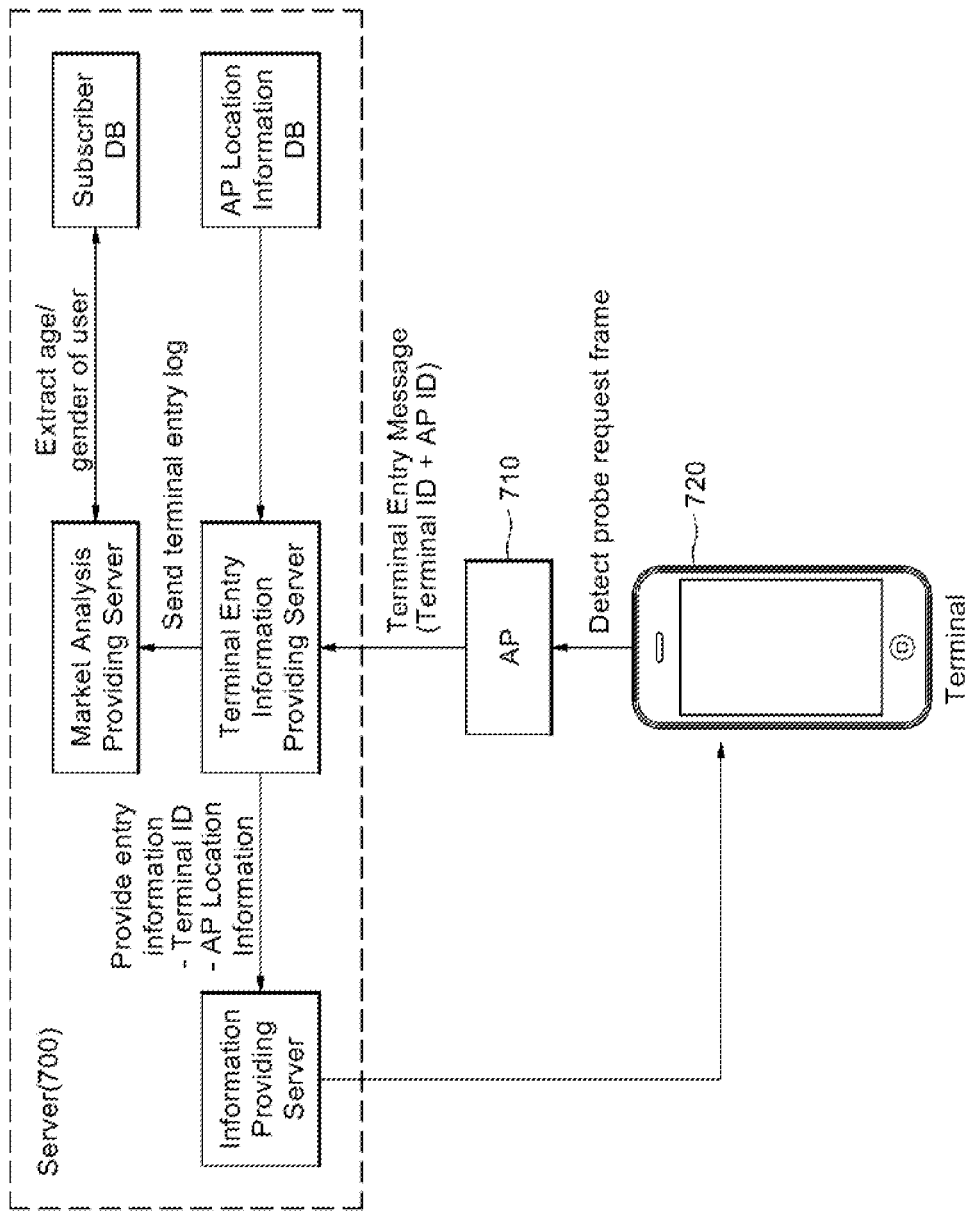
FIG. 10 illustrates a specific example of a method of providing information based on a location determination system in accordance with an embodiment.

FIG. 10 illustrates a specific example of a method of providing information based on a location determination system in accordance with an embodiment.

Referring to FIG. 10, a system for providing information may include a server 700 and an AP 710. A terminal 720 may receive information from the system for providing information. In FIG. 10, the server 700 is illustrated to include a plurality of servers linked with one another, for example, a market analysis providing server, an information providing server, a terminal entry information providing server, an AP location information DB and a subscriber DB. However, it is merely an example of the server 700. The embodiments are not limited thereto. For example, various configurations of the server 700 are possible according to, for example, the type of information provided by the server and the method of obtaining and configuring the provided information, as described above. The server 700 may be implemented as a single server or a plurality of linked servers. If the server is constituted with a plurality of linked servers, some of the plurality of linked servers may be managed and/or operated by another server and another entity. Moreover, depending on the embodiment, there may be other DBs that have information (e.g., advertisement, lifestyles information, etc.) to be provided to the terminal stored therein, in addition to the AP location information DB and the subscriber DB. These DBs may be mutually linked with and referenced by individual servers constituting the server 700.

Once the AP 710 detects a probe request frame sent by the terminal 720 within a BSA thereof, the AP 710 transmits a terminal entry message to the server 700. The terminal entry message, by which the AP 710 notifies the server 700 that the terminal 720 is present within the BSA thereof, may include an ID of the terminal and an ID of the AP 710, as described above.

After receiving the terminal entry message from the AP 710, the terminal entry information providing server may obtain location information of the AP 710 from the AP location information DB of the AP 710 based on the ID of the AP. As described above, in the case where the location information of the AP 710 is included in the terminal entry message, it shall be appreciated that the step of inquiring of the AP location information DB about the location of the AP 710 may be skipped. By providing the entry information to the information providing server, the terminal entry information providing server may allow the information providing server to select/configure information based on the location information of the terminal and to provide the selected/configured information to the terminal.

In accordance with another embodiment, the terminal entry information providing server may send an entry log of the terminal to the market analysis providing server to allow the market analysis providing server to generate supplementary information, for example, an analysis of markets around the BSA of the AP installed in a specific region, through the entry log of the terminal. For example, through an analysis of a log of the terminal entering a region in which the AP 710 is installed (hence the BSA of AP), the supplementary information may be generated/managed/provided by analyzing the number of terminals entering per day or per time period, the user types of terminals entering the BSA, etc.

Figure 11:
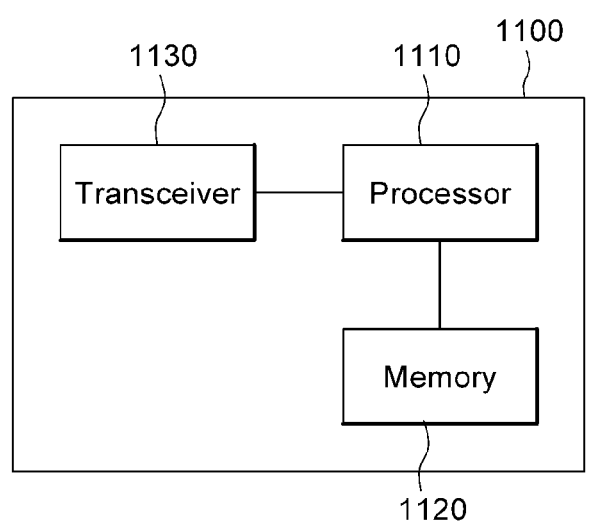
FIG. 11 is a block diagram illustrating an AP in accordance with an embodiment.

FIG. 11 is a block diagram illustrating an AP in accordance with an embodiment. Referring to FIG. 11, an AP 1100 may include a processor 1110, a memory 1120 and a transceiver 1130. The transceiver 1130 transmits/receives wireless signals and implements an IEEE 802.11 physical layer. The processor 1110 is connected with the transceiver 1130 and realizes an IEEE 802.11 MAC layer. The processor 1110 may perform operations related to the above-described method of determining a location of a terminal.

The processor 1110 and/or transceiver 1130 may include an ASIC (application-specific integrated circuit), another chipset, a logical circuit and/or a data processing device. The memory 1120 may include a ROM (read-only memory), a RAM (random access memory), a flash memory, a memory card, a storage medium and/or other storage devices. In case the embodiment is realized in the form of software, the above-described method may be realized through modules (processes, functions, etc.) performing the above-described functions. The modules may be stored in the memory 1120 and executed by the processor 1110. The memory 1120 may reside inside or outside the processor 1110 and may be connected with the processor 1110 through various well-known means.

The above-described embodiments include various aspects of examples. Although it may not be possible to describe all possible combinations of various aspects, it shall be appreciated by anyone of ordinary skill in the art to which the present invention pertains that other combinations are possible. Therefore, the embodiments of the present disclosure shall encompass every possible substitution, modification and variation belonging to the claims appended below. The embodiments of the present disclosure described hitherto in detail are provided for illustrative purposes to demonstrate the technical ideas of the embodiments of the present disclosure, which shall not be interpreted to be limited by the described embodiments. The scope of the embodiments of the present disclosure shall be defined by the claims appended below.

What is claimed is:

1. A method of determining, by an access point (AP), a location of a terminal by use of a wireless local area network (LAN), the method comprising:
   detecting a probe request frame transmitted by a terminal that searches for a wireless LAN through active scanning;
   obtaining a medium access control (MAC) address of the terminal from a configuration value of an source address (SA) field of the probe request frame regardless of a configuration value of a BSSID field of the probe request frame; and
   transmitting the MAC address of the terminal and ID information of the AP to a server;
   wherein the obtaining comprises discarding the probe request frame after obtaining the MAC address of the terminal when the configuration value of the BSSID field indicates a specific AP other than the AP.

2. The method of claim 1, wherein the ID information of the AP comprises an IP address of the AP, a MAC address of the AP, an ID of a basic service area (BSA) of the AP and an ID of the AP.

3. The method of claim 2, wherein the ID information of the AP further comprises location information of the AP.

4. The method of claim 1, wherein the detecting of the probe request frame is performed through one of a physical carrier sense and a virtual carrier sense of the AP.

5. The method of claim 1, further comprising:
   transmitting a probe response frame to the terminal in response to the probe request frame when the configuration value of the BSSID field indicates one of the AP and a wildcard BSSID.

6. A system for providing information based on a location of a terminal by use of a wireless local area network (LAN), the system comprising:
   an access point (AP) configured to detect a probe request frame transmitted by a terminal searching for a wireless LAN through active scanning and obtain a medium access control (MAC) address of the terminal from a configuration value of an source address (SA) field of the probe request frame regardless of a configuration value of a BSSID field of the probe request frame; and
   a terminal entry information providing server configured to obtain the MAC address of the terminal and ID information of the AP and obtain location information of the terminal from the ID information of the AP,
   wherein the AP is configured to:
   discard the probe request frame after obtaining the MAC address of the terminal when the configuration value of the BSSID field indicates a specific AP other than the AP.

7. The system of claim 6, wherein the ID information of the AP comprises a MAC address of the AP, an ID of a basic service area (BSA) of the AP and an ID of the AP.

8. The system of claim 7, further comprising:
   a subscriber database configured to obtain the MAC address of the terminal, extract subscriber information of the server from the MAC address of the terminal, and provide the subscriber information to the information providing server.

9. The system of claim 6, further comprising:
   an AP location information database configured to obtain the ID information of the AP from the terminal entry information providing server and to provide BSA information of the AP indicated by the ID information of the AP to the terminal entry information providing server.

10. The system of claim 6, further comprising:
    an information providing server configured to obtain the location information of the terminal from the terminal entry information providing server, select information to be provided to the terminal based on the location information, and provide the selected information to the server.

11. The system of claim 6, wherein the AP is further configured to transmit a probe response frame to the terminal in response to the probe request frame when the configuration value of the BSSID field indicates one of the AP and a wildcard BSSID.

12. An access point (AP) comprising:
    a processor; and
    a transceiver connected functionally with the processor and configured to transmit and receive a wireless frame,
    wherein the processor is configured to:
    detect a probe request frame transmitted by a terminal searching for a wireless local area network (LAN) through active scanning;
    obtain a medium access control (MAC) address of the terminal from a configuration value of an source address (SA) field of the probe request frame regardless of a configuration value of a BSSID field of the probe request frame;
transmit the MAC address of the terminal and ID information of the AP to a server; and
wherein the processor is further configured to discard the probe request frame after obtaining the MAC address of the terminal when the configuration value of the BSSID field indicates a specific AP other than the AP.

13. The AP of claim 12, wherein the ID information of the AP includes an IP address of the AP, a MAC address of the AP, an ID of a basic service area (BSA) of the AP and an ID of the AP.

14. The AP of claim 12, wherein the process if further configured to transmit a probe response frame to the terminal in response to the probe request frame when the configuration value of the BSSID field indicates one of the AP and a wildcard BSSID.

* * * * *